United States Patent [19]

Inoue

[11] 4,368,412

[45] Jan. 11, 1983

[54] MICROPROCESSOR-CONTROLLED MOTOR DRIVE CONTROL SYSTEM

[75] Inventor: Kiyoshi Inoue, Tokyo, Japan

[73] Assignee: Inoue-Japax Research Incorporated, Yokohama, Japan

[21] Appl. No.: 231,433

[22] Filed: Feb. 4, 1981

[51] Int. Cl.$^3$ .......................................... G05D 23/275
[52] U.S. Cl. .................................... 318/632; 318/568; 318/603
[58] Field of Search ......................... 318/632, 568, 603

[56] References Cited

U.S. PATENT DOCUMENTS

| 3,725,654 | 4/1973 | Tripp | 318/632 X |
| 3,917,930 | 11/1975 | Davey et al. | 318/632 |
| 4,025,838 | 5/1977 | Watanabe | 318/568 |
| 4,140,953 | 2/1979 | Dunne | 318/632 X |
| 4,153,863 | 5/1979 | Schachte et al. | 318/341 |
| 4,206,393 | 6/1980 | Chiba | 318/632 |

Primary Examiner—B. Dobeck
Attorney, Agent, or Firm—Karl F. Ross

[57] ABSTRACT

A microprocessor-controlled drive control system for a motor includes a driver circuit for the motor, a signal input unit for receiving an input command signal representing a desired extent of angular displacement of the motor, a microcomputer having an input/output interface connected between the signal input unit and the driver circuit and a central processing unit (CPU) for producing a control command signal in accordance with the input command signal and applying the control command signal to the driver circuit, thereby providing from the latter a drive signal for the motor in accordance with the control command signal, an encoder for sensing an angular displacement of the motor brought about by the drive signal and producing a succession of pulses representing the angular displacement being sensed, logic-circuit means connected between the encoder and the interface for applying to the central processing unit a feed-back signal at least in part derived from the encoder output pulses to modify the control command signal and consequentially the drive signal, and an interrupt unit associated with the microcomputer for intermittently providing an interrupt signal to the central processing unit, thereby permitting the latter to execute the modification of the control command signal.

6 Claims, 3 Drawing Figures

MICROPROCESSOR-CONTROLLED MOTOR DRIVE CONTROL SYSTEM

FIELD OF THE INVENTION

The present invention relates to a motor drive control system and, more particularly, an improved control system for driving a motor to perform a desired displacement with an increased degree of precision and operating stability.

BACKGROUND OF THE INVENTION

A conventional drive control system for a motor may be equipped with a tacho-generator connected to the motor shaft for providing an electric signal. This signal may be used as a feed-back signal and applied to a driver circuit for controlling the rate of rotation or angular velocity of the motor in an attempt to increase the operating stability and precision of the motor. The tacho-generator can, however, be a significant load for the motor system and may seriously cause a drop of response thereby to an input drive signal.

OBJECTS OF THE INVENTION

It is accordingly an important object of the present invention to provide an improved drive control system for operating a motor, which eliminates the use of a tacho-generator or a like high load sensor and which is a capable of driving the motor with an increased rate of response to an input displacement command signal and with increased operating precision and stability.

SUMMARY OF THE INVENTION

In accordance with the present invention, there is provided a drive control system for a motor, comprising: a drive circuit for the motor; a signal input unit for receiving an input command signal representing a desired extent of angular displacement of the motor; a microcomputer having an input/output interface connected between the signal input unit and the driver circuit and a central processing unit or microprocessor for producing a control command signal in accordance with the input command signal and applying the control command signal to the driver circuit, thereby providing from the latter a drive signal for the motor in accordance with the control command signal; an encoder for sensing an angular displacement of the motor being achieved by the drive signal and producing a succession of pulses representing the angular displacement being sensed; logic-circuit means connected between the encoder and the input/output interface for applying to the microprocessor a feed-back signal at least derived from the output pulses of the encoder to modify the control command signal and consequentially the drive signal; and an interrupt unit associated with the microcomputer for intermittently providing an interrupt signal to the centeral processing unit thereby permitting the latter to execute the modification of the control command signal.

The driver circuit is preferably adapted to provide, as the drive signal, a series of drive pulses having an on-time τon and off-time τoff at least one of which is variable. The on-time τon and/or off-time τoff may be varied controlledly by the aforementioned modification of the control command signal in the microprocessor.

The signal input unit is preferably adapted to issue a succession of input command pulses defining the input command signal.

The logic-circuit means may include a differential counter responsive to the input command pulses and to the output pulses of the encoder for producing an output signal representing a difference therebetween and applying the output signal through the interface to the central processing unit to form the control command signal therein.

The logic-circuit means may further include a second differential counter responsive to the output pulses of the encoder and to a reference signal in the form of a succession of reference pulses furnished from the central processing unit through the input/output interface for providing an output signal representing a difference between the encoder output pulses and the reference pulses, the output signal of the second differential counter being returned through the interface to the microprocessor to produce the aforementioned modification of the control command signal.

BRIEF DESCRIPTION OF THE DRAWING

These and other objects, features and advantages of the present invention will become more readily apparent from the following description of a preferred embodiment thereof taken with reference to the accompanying drawing in which.

SPECIFIC DESCRIPTION

Figure 1:
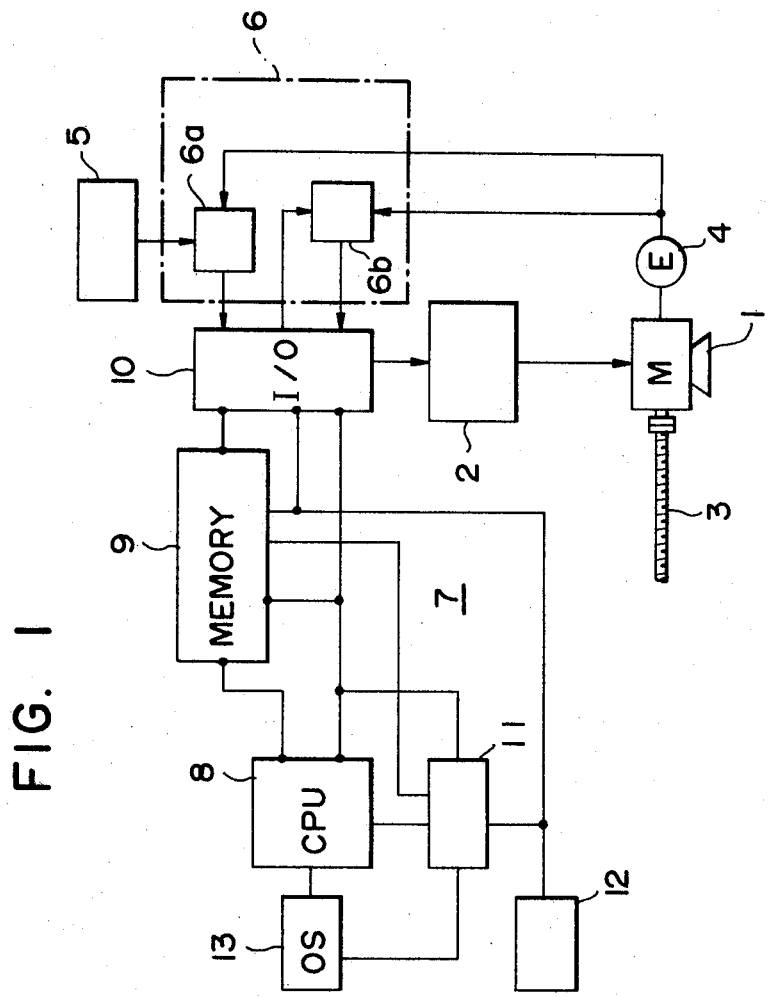
FIG. 1 is a block diagram illustrating a drive control system for a motor which embodies the principles of the present invention.

In the system shown in FIG. 1, a motor designated at 1 is rotated in response to a drive signal furnished by a drive circuit 2 which may be constituted as a power amplifier. A feed screw 3 is securely coupled to the rotary shaft of the motor 1 and used to carry a load not shown. The motor 3 is equipped with an encoder for sensing the angle of rotation of the motor 1 shaft to provide an output signal in the form of digital pulses proportional in number to the sensed value of the instantaneous angle of rotation. A displacement command signal (e.g. in the form of a succession of pulses) to the system representing a desired extent of rotation is set at an input unit 5. A logic circuit unit 6 includes a first differential counter 6a which provides a difference between the input value of rotation at the input signal unit 5 and the sensed value of rotation being furnished by the encoder 4 and a second differential counter 6b which provides a difference between a reference value and the sensed value of rotation being furnished by the encoder 4. A microcomputer 7 is provided for computing from the input signal at the unit 5 an optimum velocity for the rotation of the motor 1 in accordance with the desired extent of rotation includes a microprocessor or central processing unit (CPU) 8, a memory unit 9 and an input-/output interface 10. A system controller 11 is provided for the central processing unit 8. An interrupt unit 12 is coupled to the controller 11 and the memory 9 to permit an interrupt to be accomplished at a preprogrammed time interval. A clock for the microcomputer 7 is shown at 13.

A desired extent for the rotation of the motor 1 is set at the signal input unit 5. The set value in the form of a succession of pulses is transmitted via the first differential counter 6a to the microprocessor 7. The value is read by the central processing unit 8 successively in accordance with control signals furnished by the system controller 11 and is thereby processed to calculate an optimum velocity for the rotation or angular displacement of the motor 1. A signal in the form of pulses representing the optimum velocity is produced at the input/output interface 10 and applied via the amplifier/driver circuit 2 to the motor 1. The encoder 4 rotates with the motor 1 shaft and provides a digital signal representing the driven rotation of the motor 1. The number of pulses furnished denotes the driven angular displacement of the motor 1. The number of pulses furnished per unit time denotes the angular velocity or the rate of driven rotation of the motor 1. The difference between the input command and the encoder 4 output is provided by the differential counter 6a in the logic circuit 6 and is applied to the microcomputer 7 through the interface 9. The central processing unit 8 in the microcomputer 7 processes the differential signal to furnish through the driver circuit 2 the drive signal for controlledly rotating the motor 1. Meanwhile, the differential counter 6b in the logic circuit 6 is furnished with the reference value calculated by the central processing unit 8 and transmitted through the interface 10 to the provide the difference between the reference value and the encoder 4 sensed output, the differential signal being then furnished through the interface 10. The central processing unit 8 responds to the differential signal to calculate a duty factor of drive pulses such as to make the difference nil or such that the sensed velocity approaches the optimum value established and to furnish the drive pulses with the calculated duty factor to the motor 1 through the driver circuit 2.

The drive signal is a succession of pulses with an on time $\tau on$ and an off-time $\tau off$, one or both of which may be varied at the driver circuit 2, and a period $= \tau on + \tau off$ which may be constant. Assuming that the period is constant, the increase of the duty factor $\tau on/\tau off$ provides a higher rate of rotation of the motor 1 and the decrease of the duty factor $\tau on/\tau off$ provides a lower rate of rotation of the motor 1. An optimum duty factor is thus calculated in the central processing unit 8 in accordance with the output signal from the differential counter 6a and the drive pulses are modified at the driver circuit 2 to have the optimum duty factor determined.

Assume, for example, the mode of controlling an angular position of the motor 1. When an input command to this end is received at the input signal unit 5, the driver circuit 2 will operate to commence driving the motor 1 towards the end of achieving the commanded angular displacement. In the initial period of the rotation, the rate of rotation will be low and the velocity signal sensed by the encloder 4 will accordingly be a small value. As a result, the differential value which develops from the counter 6b will be large. Then the central processing circuit 8 each time a squeeze signal is incoming from the unit 12 will operate to determine a duty factor for the drive pulses such that the sensed velocity approaches the velocity range previously calculated and to command the drive circuit 2 that the drive pulses being applied to the motor 1 be modified to change the duty factor to the determined value. Thus, in the initial period, the drive pulses are controlled to increase the duty factor to increase the rate of rotation of the motor 1. As a consequence, a quick initiation of the rotation of the motor 1 is provided. Subsequent to the initial period, an increase in the rate of rotation of the motor 1 causes the encoder 4 to proportionally develop an increased rate of sensing pulses which in turn reduces the differential signal provided by the differential counter 6b. When the differential signal reduces to a lower limit or nil, the driver circuit 2 will be operated to produce the drive pulses of a reduced duty factor which are applied to the motor 1 to rotate it at a given angular velocity. The motor 1 will continue to rotate at the velocity which is held constant until it approaches the end of the commanded displacement. As this latter is approached, the differential signal from the counter 6a becomes smaller, causing the duty factor of the drive pulses to be modified to a lower value as a result of the computation at the CPU 8 and the consequential command to the drive circuit 2. The rate of rotation of the motor 1 is thus reduced. At this time, the reference value furnished to the differential counter 6b is controlled to be reduced to allow the motor 1 to continue to rotate as long as the differential output lies in a predetermined range. When the encoder 4 output becomes large so that the differential value is shifted outside that range, the central processing unit 8 will output a further duty-factor value for the drive pulses which is still lower to reduce the rate of rotation of the motor 1. In this manner, the motor 1 is capable of being stopped extremely precisely at the very position commanded at the input signal unit 5, having achieved the angular displacement under microcomputer's directed velocity control in the course.

Each time a displacement command signal is applied to the input unit 5, the system initiates the control cycle. In each cycle, the differential counter 6a compares the command pulses of the input unit 5 and the sensing pulses of the encoder 5 and continues to issue a drive command to the motor 1 via the driver/amplifier circuit 2 until the sensing pulses in number reach the command pulses. When the coincidence is reached indicating that the rotation of the motor 1 reaches the extent or angular position given by the input command signal, the drive command is terminated to stop the motor 1. During this cycle of operation, the CPU operates to control the drive signal issued from the driver/amplifier 2 to vary the rate of rotation of the motor 1 in an optimum mode in accordance with the extent of displacement given by the input command. To this end, the deviation of the velocity from a preselected range is ascertained from the sensing signal of the encoder 4. When a deviation occurs, the duty factor of the drive pulses is altered by the processing operation of the CPU 8 in response to an interrupt signal from the unit 12 so as to return the velocity to the preselected range. Thus, the motor 1 commences rotating rapidly and with an accelerated rate of response to promptly reach a steady operation. When the steady operation is reached, the motor 1 is subject to a minimum of velocity change due to a variation in the load. At the completion of the given extent of angular displacement, the motor 1 stops rapidly and with an accelerated rate of response and without any over-travel. The result is an extremely high accuracy in stopping the motor 1 at the desired angular position.

The signal input unit 5 may take any of various known forms. For example, data for a series of displacement commands may be memorized on a tape. A register may be used to memorize each unit of the data on the tape and to reproduce the same in the form of a succession of electrical pulses which are applied to the logic circuit 6. Alternatively, ROM and/or RAM may be used for the storage of the data which are reproduced by a selection circuit to provide a succession of electrical pulses to be applied to the logic circuit 6. In electrical discharge machining (EDM), a displacement command signal in the form of a succession of electrical pulses is produced in a servocontrol circuit connected to detect a parameter in the EDM gap formed between a tool electrode and a workpiece one of which is to be moved by the operation of the motor 1 to follow the material removal process therein.

The displacement command signal applied to the signal input unit may also be a time signal for determining the time in which the motor 1 is driven and thereby determining an extent of the rotation thereof. In this case as well, the rate of rotation or angular velocity is controlled in response to a change in the load in an optimum manner by applying the velocity detection signal of the encoder 4 to the CPU 8. The processing operation of the CPU 8 provides an in-process correction of the drive signal such that the motor 1 is rotated at a predetermined angular velocity in spite of a change in the load and hence with an increased stability of operation.

The interrupt unit 12 as described previously provides an interrupt signal periodically or with predetermined time intervals. The time interval may optionally be taken and may be varied. When an interrupt signal is accepted, a velocity signal derived from the encoder 4 is applied to the output from the interface 10 to the driver circuit 2. The CPU 8 performs the computation of an error from the desired displacement command and, when the result is found to be in the predetermined range, stops the operation without altering the duty factor of the control output. If the result is found to be outside the range, the CPU 8 proceeds to alter the duty factor, thereby modifying the angular velocity of the motor 1. This checking and modification operation is performed at predetermined or varying time intervals so that the rate of rotation is automatically held to be optimum with respect to the desired extent of angular displacement. The system controller 11 may be arranged to allow the interrupt signal from the unit 12 to be passed to the CPU 8 to permit the modification of the drive signal when the feed-back signal from the logic circuit 7 exceeds a predetermined value.

The velocity modification with the drive signal or pulses may be achieved by holding the on-time $\tau on$ constant while varying the off-time $\tau off$ thereof, holding the off-time $\tau off$ constant while varying the on-time $\tau on$ thereof or varying both the on-time $\tau on$ and the off-time $\tau off$ thereof. The modification of the pulse parameters for controlling the motor drive in this manner is extremely advantageous in accomplishing the control of both position and velocity with readiness and with precision. The encoder 4 may be any of optical, induction and magnetic types well known in the art, which are capable of digitalization of a continuous angular displacement, thereby peremitting both position and velocity of the motor shaft to be accurately sensed.

Figure 2:
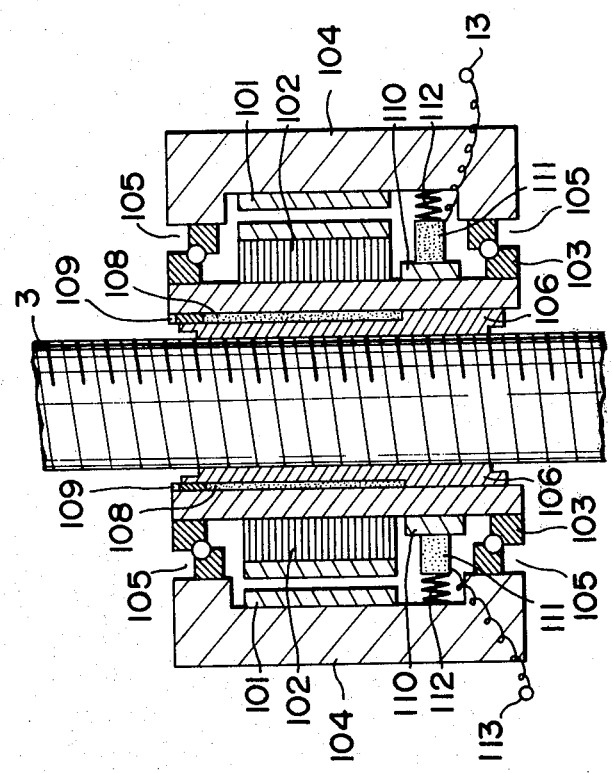
FIG. 2 is a longitudinal view in section diagrammatically illustrating the structure of a motor which may be used with the system of FIG. 1.

In FIG. 2 there is shown in longitudinal section a novel structure of the motor 1 which may be used with the system of FIG. 1. The motor includes a stator 101 constituted by a permanent magnet and a rotor 102 having a coil wound thereon and mounted on a cylinder 103. The cylinder 103 is coupled with a fixed member 104 via a bearing 105 and thereby rotatably journaled on the member 104. A nut 106 is secured to the inner wall of the cylinder 103 and is rotated therewith. The feed screw 3 is shown in engagement with the nut 106 and is used to convert the rotation of the nut 106 into a linear movement. The coupling between the rotary cylinder 103 and the rotary nut 106 is formed with a pocket 108 filled with a pressure medium, e.g. oil or elastomeric material, for adjusting the coupling of these members. A screw 109 is threaded onto with the nut 106 and the cylinder 103 to adjustably compress the pressure medium in the pocket 108. Commutators 110 are secured to the outer wall of the cylinder 103 and are positioned in contact with brushes 111 urged thereagainst under the pressure produced by springs 112 and energized from terminals 113, respectively, with a motor drive signal produced by the system of FIG. 1.

Figure 3:
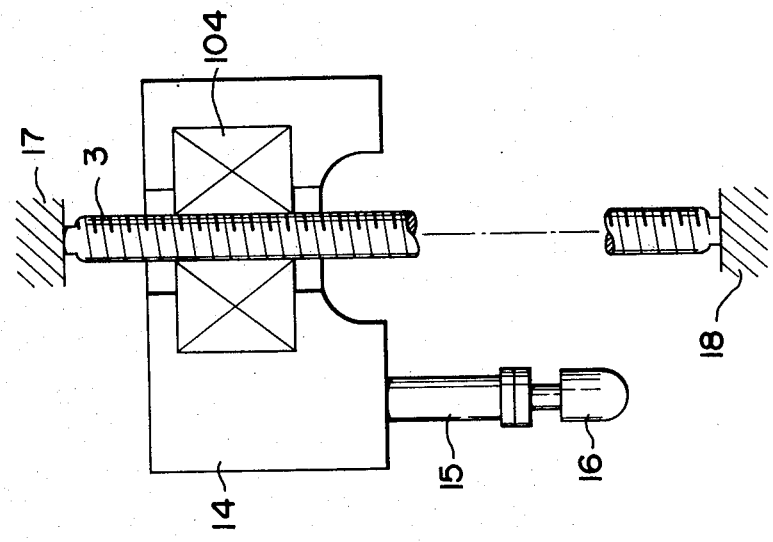
FIG. 3 is an elevational view diagrammatically illustrating an electrical machining feed arrangement with a motor for embodying the system of the invention.

FIG. 3 shows in elevation an electrial machining (e.g. electrical discharge machining) arrangement for controlledly driving a tool head 14 to which a machining tool electrode 16 is secured via a supporting spindle, the head 14 being displaced vertically to move the tool electrode 16 towards and away from a workpiece (not shown) juxtaposed therewith across a machining gap. To this end, the fixed member 104 in FIG. 2 is secured to the tool head 14 is linearly moved along the axis of the feed screw 3 when the latter is rotated in the motor structure shown in FIG. 2. The feed screw 3 is shown to be pp. supported between a pair of fixed positions 17 and 18 so as to be held against the linear displacement.

What is claimed is:

1. A drive control system for a motor, comprising:
    a driver circuit connected to the motor;
    a signal input unit for receiving an input command signal representing a desired extent of angular displacement of the motor and generating a train of pulses representing said command signal;
    a microcomputer having an input/output interface connected to said driver circuit, and a central processing unit for producing a control command signal and applying said control command signal to said driver circuit, thereby providing from the latter a drive signal for said motor in accordance with said control command signal;
    an encoder for sensing an angular displacement of said motor being achieved by said drive signal and producing a succession of pulses representing said angular displacement being sensed;
    logic-circuit means connected between said encoder and said interface and between said signal input unit and said interface, said logic circuit means including a differential counter receiving said pulses from said signal input output and said encoder for registering a differential count thereof and applying the differential count to said interface to produce the modification of said control command signal in accordance therewith and consequentially said drive signal; and
    an interrupt unit associated with said microcomputer for intermittently providing an interrupt signal to said central processing unit, thereby permitting the latter signal to execute said modification of the control command signal.

2. The system defined in claim 1 wherein said driver circuit is adapted to provide, as said drive signal, a series of drive pulses having an on-time and off-time at least one of which controlledly is varied by said modification of the control command signal in said microcomputer.

3. The system defined in claim 1 or claim 2 wherein said signal input unit is adapted to issue a succession of input command pulses defining said input command signal.

4. The system defined in claim 1 or claim 2 wherein said logic-circuit means includes a second differential counter responsive to said pulses of the encoder and to a reference signal in the form of a succession of reference pulses furnished from said central processing unit through said interface for providing an output signal representing a difference between said encoder pulses and said reference pulses, said output signal of said second differential counter being returned through said interface to said microprocessor to produce said modification of the control command signal.

5. A drive control system for a motor comprising:
a driver circuit connected to the motor;
a signal input unit for receiving an input command signal representing a desired extent of angular displacement of the motor and generating a train of pulses representing said command signal;
a microcomputer having an input/output interface connected to said driver circuit, and a central processing unit for producing a control command signal and applying said control command signal to said driver circuit thereby providing from the latter a drive signal in accordance with said control command signal;
an encoder for sensing an angular displacement of said motor being produced by said drive signal and generating a succession of pulses representing said angular displacement being sensed; and
logic circuit means connected with said interface and including:
a first differential counter connected with said encoder and said unit for receiving said pulses from said unit and said encoder and producing a first differential count thereof and applying said first differential count to said interface, and
a second differential counter connected to said encoder and to said interface for receiving reference pulses from said microcomputer and said pulses from said encoder for producing a second differential count of the received pulses and applying said second differential count to said interface whereby said control command signal is modified in accordance with said differential counts.

6. A motor system comprising:
a drive control system as defined in claim 1 or claim 5, and an electric motor, operated by said driver circuit, said electric motor comprising a leadscrew;
an elongated nut threadedly engaged with said leadscrew and extending axially therealong;
a sleeve surrounding said nut and defining therewith a fluid pressurizable compartment adapted to receive the fluid at a pressure coupling said sleeve with said nut;
an armature winding on said sleeve;
a cylindrical housing surrounding said sleeve and forming a stator cooperating with said armature winding;
commutators on said sleeve within said housing electrically connected to said armature; and
brushes spring mounted in said housing bearing upon said commutators.

* * * * *